United States Patent
Schäffer et al.

(10) Patent No.: US 8,857,291 B2
(45) Date of Patent: Oct. 14, 2014

(54) FLYWHEEL, INTERNAL COMBUSTION ENGINE WITH FLYWHEEL AND SYSTEM COMPRISING AN INTERNAL COMBUSTION ENGINE AND A MACHINE DRIVEN THEREBY

(75) Inventors: Christian Schäffer, Markdorf (DE); Martin Kaifler, Tettnang (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 458 days.

(21) Appl. No.: 12/800,128

(22) Filed: May 7, 2010

(65) Prior Publication Data
US 2010/0307287 A1 Dec. 9, 2010

(30) Foreign Application Priority Data
May 8, 2009 (DE) .................. 10 2009 002 953

(51) Int. Cl.
*F16F 15/315* (2006.01)
*F16D 1/076* (2006.01)
(52) U.S. Cl.
CPC .................. *F16F 15/3156* (2013.01); *F16D 1/076* (2013.01)
USPC ...................... 74/572.2; 74/572.21
(58) Field of Classification Search
USPC ........ 74/572.21, 572.11, 572.2, 572.1, 433.5; 123/192.1; 310/74, 153; 381/150
See application file for complete search history.

(56) References Cited

U.S. PATENT DOCUMENTS

| | | | |
|---|---|---|---|
| 1,663,803 A * | 3/1928 | Link | 192/107 R |
| 3,743,869 A * | 7/1973 | Hugli | 310/348 |
| 4,407,602 A | 10/1983 | Terry, Jr. | |
| 5,194,044 A * | 3/1993 | Jackel et al. | 464/24 |
| 5,261,516 A * | 11/1993 | Friedmann | 192/70.17 |
| 5,655,189 A * | 8/1997 | Murano | 399/220 |
| 5,863,252 A * | 1/1999 | Friedmann et al. | 464/24 |
| 6,274,803 B1 * | 8/2001 | Yoshioka et al. | 136/201 |
| 6,651,795 B2 * | 11/2003 | Ellis et al. | 192/70.14 |

FOREIGN PATENT DOCUMENTS

| | | |
|---|---|---|
| DE | 27 42 714 | 3/1978 |
| DE | 10 2004 025 665 | 12/2005 |
| DE | 10 2004 037 178 | 3/2006 |

* cited by examiner

*Primary Examiner* — Thomas Diaz
(74) *Attorney, Agent, or Firm* — Klaus J. Bach

(57) ABSTRACT

In a flywheel for mounting as a coupling element between an internal combustion engine and a machine to be driven thereby, including a flywheel flange for connecting the flywheel to the machine and a driver flange for connecting the flywheel to the crankshaft of the internal combustion engine, coupling structures are provided between the flywheel flange and the driver flange which coupling structures include insulating connecting areas which electrically insulate the flanges from each other.

9 Claims, 2 Drawing Sheets

FLYWHEEL, INTERNAL COMBUSTION ENGINE WITH FLYWHEEL AND SYSTEM COMPRISING AN INTERNAL COMBUSTION ENGINE AND A MACHINE DRIVEN THEREBY

BACKGROUND OF THE INVENTION

The invention resides in a flywheel for mounting to an internal combustion engine and coupling to a machine driven thereby, including a flywheel flange and coupling means for coupling the machine to the flywheel. The invention also relates to an internal combustion engine including a flywheel and a system comprising the internal combustion engine and the machine to be driven as well as the use of such a system.

Internal combustion engines are usually connected electrically to a reference potential, for example to ground, via a ground cable connected to the crankcase of the engine. With the use of an internal combustion engine in connection with a system including a machine to be driven thereby such as a generator for example, in a motor-generator unit, the generator is coupled to the engine for example via a clutch disc. A clutch disc may specifically be mounted for rotation with the crankshaft of the internal combustion engine and may be coupled in a suitable way to the shaft of a generator.

Because of an electromagnetic induction generated in the shaft of an electric machine to be driven, with the electrically conductive coupling means generally used so-called shaft voltages can be generated in the crankshaft which are also effective at the bearings of the crankshaft. This may cause problems because the bearings may be damaged by electroerosion. A reason herefor may be electric discharges through the thin lubricant films present in the bearings as a result of the voltages present in the shaft. The discharges may result in material ablation or material displacement at the bearing surfaces. In the worst case, the crankshaft bearings or other parts of the internal combustion engine may be severely damaged.

DE 10 2004 025 665 134 assigned to the assignee of the present application describes a solution for avoiding shaft voltages and the formation of creeping currents between the crankshaft, a housing and the reference potential. The solution resides in providing a low-resistance path for the creeping currents. To this end, DE 10 2004 025 665 B4 provides a current collector including a rotor which is connected for rotation with a rotor connected to the crankshaft and a stator connected the crankcase of the internal combustion engine wherein the stator includes an electrically well conducting structure between the rotor and a reference potential in the stator. The conducting structure includes for example carbon brushes. Basically, such a structure is subject to wear and requires servicing because of the dynamic contact between the rotor and the stator.

An alternative solution is disclosed in Applicants DE 10 2004 037 178 A1. In this case, for an internal combustion engine a flywheel is used which comprises a single piece and forms part of a clutch wheel which includes a clutch disc that is flanged to the flywheel. The clutch disc of the clutch wheel serves to connect the machine to be driven by the internal combustion engine, for example an electric generator, to the engine. Here, the flange and/or clutch disc consist of an electrically non-conductive material so that the crankshaft of the internal combustion engine is electrically insulated from the machine to be driven. This basically good solution however has been found to be comparably expensive in certain applications or at least in need for improvement.

Actually, a solution would be desirable wherein shaft voltages in an internal combustion engine could be avoided by a simple flywheel design which is electrically insulating.

It is therefore the object of the present invention to provide an arrangement and a use, by which electric voltages in shafts of internal combustion engines can be avoided in a relatively simple manner in particular by means of an electrically insulating flywheel for coupling the internal combustion engine and the electrical machine to be driven thereby, which flywheel is of comparatively simple design and can be manufactured at relatively low costs.

SUMMARY OF THE INVENTION

In a flywheel for use as a coupling element between an internal combustion engine and a machine to be driven thereby, including a flywheel flange for connection to the machine and a driver flange for connection to the crankshaft of the internal combustion engine, coupling structures are provided between the flywheel flange and the driver flange which coupling structures include insulating connecting areas which electrically insulate the flanges from each other.

The invention is particularly suitable for use in connection with an emergency power supply aggregate or a drive train of a motor vehicle.

The invention is based on the concept that an electrically insulating flywheel is particularly suitable to prevent the transmission of voltages and/or creep currents to an internal combustion engine, in particular to the crankshaft of an internal combustion engine. Such voltages and creep currents are potentially transmitted by a machine being driven, in particular an electrical machine, which is coupled to the internal combustion engine. Different from the consideration to provide a single component flywheel as disclosed in DE 10 2004 037 178 A1 with an electrically insulating flange and/or an electrically insulating clutch disc, it has been found by the present inventors that it is more advantageous if the electrical insulation is provided as part of the flywheel itself.

In consideration of this position of the inventors, the present invention provides for a flywheel which, simply said, is a multipart flywheel which includes a flywheel flange and a driver flange which are electrically insulated from each other.

This has in particular the advantage that the arrangement of the connecting locations for the coupling of the flywheel to the machine to be driven such as a flange or a clutch disc is not affected by the structures providing for the electrical insulation. Rather, with the solution provided by the present invention, practically any electrical machine, especially a generator can be coupled to the flywheel using for example a standardized so-called SAE connection. In other words, a coupling means for coupling the machine to be driven to the internal combustion engine can, by design and geometrically, be in accordance with the standards of an SAE connection. This has the advantage that there is no need to impose on the manufacturer of the electrical machine any instructions or requirements concerning a permissible shaft voltage or the use of certain insulating construction components.

The drive flange is preferably designed for direct connection to the crankshaft of the internal combustion engine. To this end, the driver flange is designed to fit to the crankshaft. The flywheel flange is furthermore designed so as to be capable of supporting the coupling means. It has been found that it is possible in a comparatively simple and cost-effective manner to insulate the flywheel flange and the driver flange from each other. As a result, the insulation function is integrated into a component which is anyway provided at an engine, that is the flywheel, so that no additional components or measures or rules for an electric insulation at the internal combustion engine or at the connection of an electric machine (for example, a generator) are necessary.

In a particularly advantageous embodiment of the invention, the flywheel flange and the driver flange are interconnected by way of a number of engagement surfaces and connecting means. The connecting means are preferably elements such as bolts or similar connecting elements. The engagement surfaces are in particular surface areas between the flywheel flange and the driver flange.

In addition or alternatively engagement surfaces may also be surfaces between the connecting elements and the flywheel flange and/or surfaces between the connecting elements and the driver flange. Engagement surfaces are not only surfaces which are in direct contact with other engagement surfaces but also surface areas which are arranged opposite one another with a gap between them. Insofar the term engagement surfaces is to be understood to be quite broad; it comprises all surface areas between a flywheel flange, a driver flange and connecting means which are in contact with one another when the driver and flywheel flanges are joined as well as surfaces which are disposed opposite one another with a gap therebetween but which may come into contact with one another when, during operation, they are subjected to a load.

In a particular preferred embodiment of the invention, an electrical insulation is provided on at least a part of these engagement surfaces so that electrical insulation is ensured. Additionally, electrical insulation may be provided on additional engagement surfaces in that the additional engagement surfaces are contact-free, that is, a sufficiently large gap and possibly fixed distance is normally provided between these engagement surfaces.

An insulating layer may be provided on one of the engagement surfaces for example of the driver flange and/or the flywheel flange. Another possibility for establishing an insulating area resides in providing a separate insulating body in particular between the connecting means and the driver flange and/or the connecting means and the flywheel flange. This concerns advantageously engagement surface areas which are present at the passages for connecting means and in cavities of the flywheel flange and the driver flange. Those are for example bolt connections or other bolt-like or pin-like connections.

Particularly insulating surface areas have been found advantageous which comprise a support surfaces between a driver flange and a flywheel flange, a centering collar surface of the driver flange and/or a stop of the flywheel flange with respect to the centering collar, a surface area of the driver flange and/or the flywheel flange in contact with a connecting means in particular bore surfaces accommodating a connecting means and connecting centering surface areas.

A surface on the driver flange and/or the flywheel flange in contact with a connecting means is a possibility in accordance with a particular embodiment of the invention. This concerns particularly surfaces of passages accommodating a connecting means and surface areas of connecting means and connecting means surfaces.

Further preferred developments of the invention concern the formation of insulating layers and/or separating insulating structures for forming an insulation area. Those insulation areas are preferably formed by an aluminum oxide layer which may be applied preferably by means of plasma spray deposition. Aluminum oxide surfaces of this type may have micropores and therefore are coated preferably by a resin. For maintaining desired operating tolerances or fit tolerances the sealed aluminum oxide layer may be ground.

In a further development gap spaces in the area of a number of engagement surfaces may be provided with a seal for example in the form of a lacquer coating or a polymer seal or similar.

Below, embodiments of the invention will be described on the basis of the accompanying drawings. The drawings are not intended to present the embodiments according to scale; rather, the drawings are provided as illustrations which show the invention schematically and possibly distorted. With regard to additions to the teachings which are apparent from the drawings, reference is made to the applicable state of the art. In this connection, it is to be taken into consideration that the forms and details of a particular embodiment may be modified and changed without departure from the general concept of the invention. The inventive features disclosed in the description, in the drawings and in the claims may be essential individually or in any combination for further development of the invention. Furthermore, all combinations of at least two features disclosed in the description, the drawings and/or the claims are considered to be in the scope of the invention. The general concept of the invention is not limited to the exact form or detail of the preferred embodiments shown and described below, nor is it limited to a feature which would be limited in comparison with the features claimed in the claims.

In connection with size ranges given herein, values within the named limits are to be used as desired and claimable. Further advantages, features and particulars of the invention are apparent from the following description of preferred embodiments as well as on the basis of the accompanying drawings.

DETAILED DESCRIPTION OF A PARTICULAR EMBODIMENT

Figure 1:
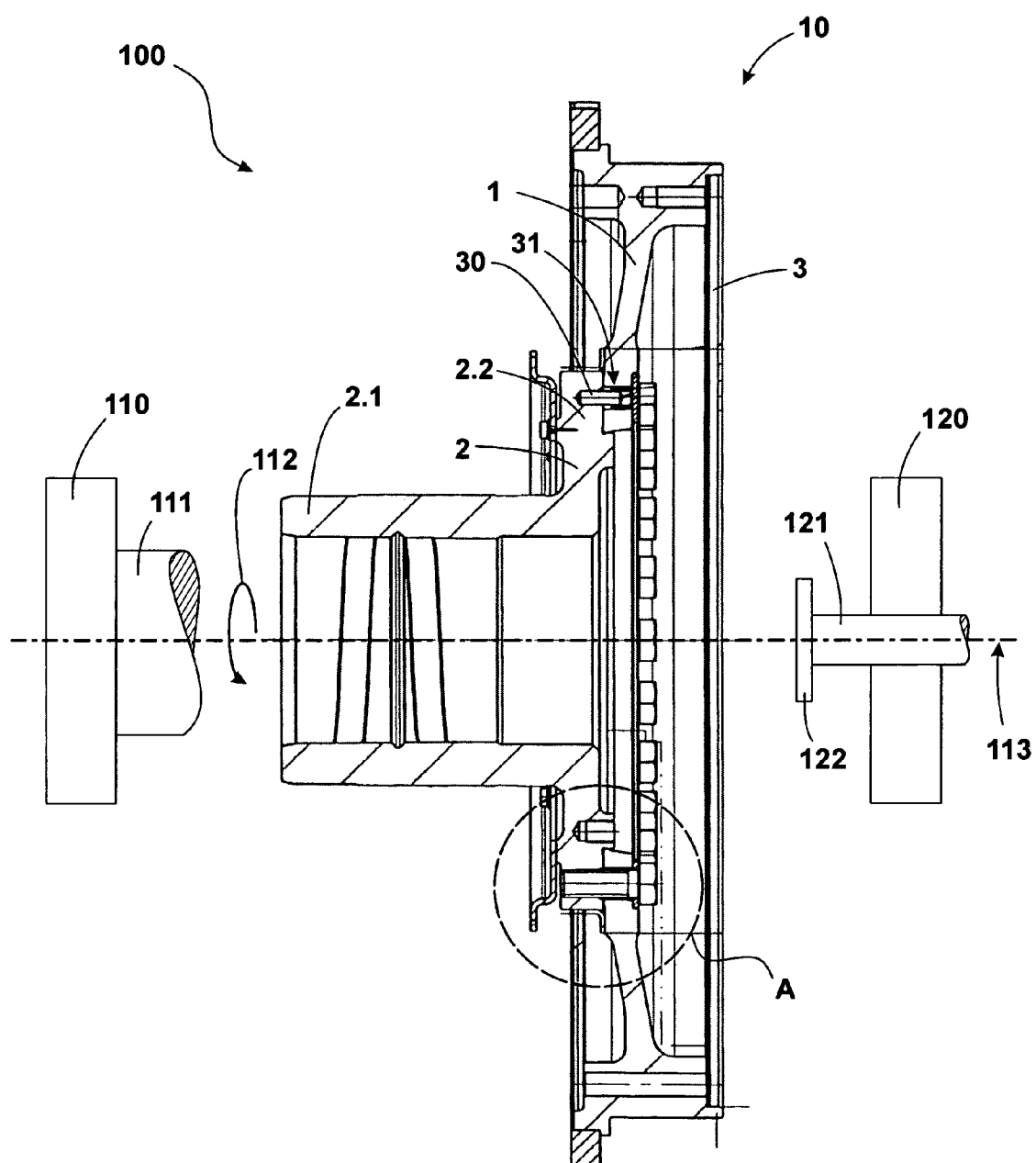
FIG. 1 shows a particularly preferred embodiment of a flywheel for attachment to an internal combustion engine and coupling to an electric generator in a cross-sectional view along the axis of the flywheel.

FIG. 1 shows partially symbolically a system 100 comprising a Diesel electric power generating unit with symbolically shown internal combustion engine 110 in the form of a Diesel engine and a machine 120 to be driven thereby in the form of an electric generator. A flywheel 10 is provided for connection to the internal combustion engine 110 and for coupling to the machine 120 to be driven. The internal combustion engine 110 includes a crankcase (not shown in detail) with a crankshaft 111 which is supported therein, and onto which the flywheel 10 is directly mounted. As shown, the flywheel 10 is rotated directly by the crankshaft 111 of the internal combustion engine 110 in the direction as indicated by the arrow 112 around the axis 113. On the same axis 113, a shaft 121 of the machine 120 to be driven, which is a generator, is arranged. The machine shaft 121 is coupled by way of an also symbolically shown counter coupling disc 122 to coupling means 3 of the flywheel 10, that is, by a coupling disc of the flywheel 10. Rotation 112 of the shaft 111 of the Diesel engine is in this way transmitted to the shaft 121 of the generator via the flywheel 10.

In accordance with the concept according to the invention, the flywheel 10 is so constructed that voltages or creeping currents possibly generated in the generator are not transmitted to the internal combustion engine 110, that is, that a transmission of such undesirable voltages or creeping currents to the crankshaft 111 of the internal combustion engine 110 is essentially prevented. To this end, the flywheel 10 includes a flywheel flange 1 and a driver flange 2 connected to the flywheel flange 1 wherein the driver flange 2 and the flywheel flange 1 are electrically insulated relative to each other as explained below in an exemplary manner.

Figure 2:
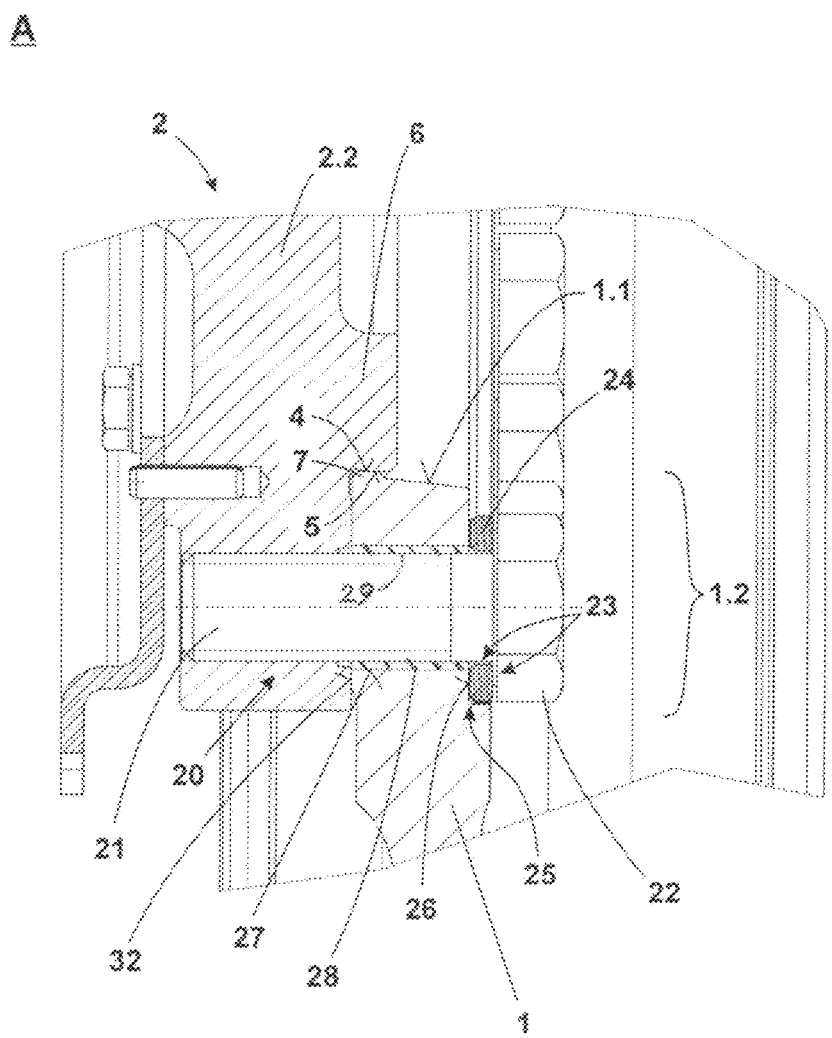
FIG. 2 is an enlarged view of detail A of FIG. 1.

On the flywheel flange 1, the coupling means 3 in the form of a clutch disc is mounted for coupling the machine 120 to the flywheel. The coupling disc 3 cooperates with a counter coupling disc 122 in such a way that the rotation 112 of the crankshaft 111 is transmitted to the shaft 121 of the machine 120 to be driven. For this purpose, the crankshaft 111 is provided with a radial driver flange part 2, 2 which includes a stub 2.1 facing the internal combustion engine and fitted for connection to the crankshaft 111. The flange part 2.2 extending radially from the stub 2.1 of the driver flange 2 is designed so as to provide for an electrical insulation between the driver flange 2 and the flywheel flange 1. It will be described below with reference to FIG. 1 and the enlarged detail section A shown in FIG. 2.

The flywheel flange 1 abuts with its circumferential area 1.2 next to the inner circumferential surface area 1.1 thereof the radially extending part 2.2 of the driver flange 2. To form an engagement surface, the driver flange 2 is provided with a radial support surface 32 axially abutting the flywheel flange 1 and a centering collar surface 4 of a centering shoulder 6 in contact with a support surface 5 of the flywheel flange 1.

The centering shoulder 6 extends in axial direction, that is, transverse to the radially extending part 2.2 of the driver flange 2. For forming the support surface 5, the circumferential part 1.2 of the flywheel flange 1 is provided with an annular web-like inwardly extending projection 7.

The contact surfaces formed in this way as support surface 32 in the driver flange 2 and the centering collar surface 4 of the driver flange 2 are provided with an insulating surface (not shown) in the form of an insulating layer disposed on the mentioned contact surfaces. In the particular embodiment shown, insulating layers are formed only on the engagement surfaces of the driver flange 2. In an other embodiment, an insulating layer may be alternatively or additionally be provided also on the corresponding opposite engagement surfaces, that is, the support surface 5 of, the flywheel 1 and the contact surface of the flywheel 1 opposite the support surface 32 of the driver flange.

The insulating layer provided for forming the electrical insulation is here an aluminum oxide layer. The aluminum oxide layer has the function of providing for an electric insulation but it also increases the engagement forces.

The aluminum oxide layer on the support surface 3 and the centering surface 4 is generally applied by a plasma spraying process. Such a process forms an aluminum oxide layer which is sufficient for an electrical insulation of the flywheel with respect to the driver flange 2. However, an aluminum oxide layer applied by a plasma spraying process may have micropores at the surface thereof. In order to prevent the collection of moisture which would detrimentally affect the insulation properties of the layer the insulation layer of aluminum oxide may subsequently be treated by a resin, that is, in a further step, an epoxy resin layer may be applied. The surface of the aluminum oxide layer with the pores containing the epoxy resin is furthermore expediently ground in the area of the centering shoulder 6 using a diamond disc for maintaining surface tolerances and fit.

Further contact surfaces provided with an insulating layer are formed between a connecting means 20 in the form of a bolt and the flywheel flange 1 on one hand and the driver flange 2 on the other. The connecting means 20 in the form of a bolt includes a bolt shaft 21 and a bolt head 22. The bolt head 22 forms at its underside together with the adjacent area of the bolt shaft 21, a profiled insulating surface area 23 which provides for electrical insulation by means of a separate insulating member 24. The insulating member 24 is in the form of a washer disposed below the bolt, that is, between the flywheel flange 1 and the bolt head 22. To this end, the washer is disposed in the radially outer area in an angular section 25 of the flywheel flange 1 on a radially extending surface area 26 of the flywheel flange. In this way, the bolt 20 is electrically insulated from the flywheel flange 1 by means of the insulating member 24 although it is otherwise electrically connected with the driver flange 2. The separate insulating member 24 in the form of a washer is a steel washer which is coated with aluminum oxide. The aluminum oxide layer on the steel washer is again a layer with surface micro-pores which are sealed. However, this layer does not need to be ground.

There are additional flywheel flange surfaces 27, which are not provided with an insulating layer but are electrically insulated from the connecting means 20 in that an insulating gap 28 is maintained. In other words, the bolt shaft 21 is spaced from the flywheel flange surface 27 by a gap 28 which is preferably filled with insulating sealing means (29).

In order to prevent a closing of the gap during operation of the flywheel 10, the connecting means 20 in the form of a bolt is fixed in its position. This is ensured in that at another location—as shown in FIG. 1—a positioning pin 30 is provided which extends between the driver flange 2 and the flywheel flange 1 and is accommodated in an opening in the driver flange 2 and received and supported in an opposite opening of the flywheel flange 1 by means of an electrically insulating sleeve 31. The electrically insulating sleeve 31 consists of a polyimide.

A closing of the insulating gap 28 is consequently prevented in that the available volume at the flywheel flange surface 27 is sufficiently large, that, furthermore, the friction between the surface areas 23, 26 and the insulating member 26 and the connecting means 20 is sufficient and additionally the positioning pin 30 with an insulating sleeve 31 ensure the accurate positioning of the connecting means 20.

In order to finally also prevent a bridging of such an electrical insulation at the insulating surfaces in the joining areas 32, 4, 23, 26, 27, 31, it is additionally provided that outwardly open gaps, openings or similar are closed by suitable seals disposed between the flywheel flange 1 and the driver flange 2. Such seals may be inserted for example into gaps or other suitable areas between the flywheel flange 1 and the driver flange 2. The seals may be for example in the form of a polyurethane seal material. Additionally, or alternatively, the flywheel flange 1 may also be coated with an insulating lacquer at its side facing the driver flange 2 and the driver flange 2 may also be coated—even after assembly.

In summary, the electrical insulation between the flywheel flange 1, the driver flange 2 and the connecting means 20 and possibly additionally the positioning pin 30 provide for a secure and comparatively simple electrical insulation between the two parts of the two-part flywheel 10. With the present invention, a flywheel 10 can be connected in an internal combustion engine 110 and coupled to a machine to be driven by the engine by way of coupling means which provide for electrical insulation between the flywheel flange and the driver flange which are mechanically interconnected.

REFERENCE NUMBERS

| | |
|---|---|
| 1 | Flywheel flange |
| 1.1 | Inner circumferential area |
| 1.2 | Circumferential area |
| 2 | Driver flange |
| 2.1 | Stub |
| 2.2 | Radial driver flange part |
| 3 | Coupling means |
| 4 | Centering collar surface |
| 5 | Support surface |
| 6 | Centering shoulder |
| 7 | Inward projection |
| 10 | Flywheel |
| 20 | Connecting means |
| 21 | Bolt shaft |
| 22 | Bolt head |
| 23 | Profiled insulating area |
| 24 | Separate insulating member |
| 25 | Angular section |
| 26 | Surface area |
| 27 | Flywheel flange surfaces |
| 28 | Insulating gap |
| 29 | Sealing means |
| 30 | Positioning pin |
| 31 | Electrically insulating sleeve |
| 32 | Support surface |
| 100 | System |
| 110 | Internal combustion engine |
| 111 | Crankshaft |
| 112 | Movement arrow |
| 113 | Axis |
| 120 | Machine |
| 121 | Shaft |
| 122 | Counter-coupling disc |

What is claimed is:

1. A flywheel (10) for mounting as a coupling element between an internal combustion engine (110) and a driven machine (120), said flywheel comprising:
 a flywheel flange (1) for connecting the flywheel to the machine to be driven,
 a driver flange (2) for connecting the flywheel (10) to the internal combustion engine, and
 coupling means (31) including connecting bolts (21) for coupling the flywheel flange (1) and the driver flange (2), the connecting bolts (21) being threaded into the driver flange (2) and provided with separate electrical insulating members (24) disposed between respective bolt head engagement surfaces of the connecting bolts (21) and the flywheel flange (1), the bolts (21) extending through openings in the flywheel flange (1) with insulating gaps (28) maintained between the walls of openings in the flywheel flange (1) and the connecting bolts (21), for electrically insulating the flywheel flange (1) with respect to the driver flange (2).

2. The flywheel (10) according to claim 1, wherein the flywheel flange (1) and the driver flange (2) are joined by the connecting bolts (21) via a number of engagement surface areas.

3. The flywheel (10) according to claim 2, wherein the engagement surface areas have engagement surfaces between at least one of the pairs consisting of the flywheel flange (1) and the driver flange (2), and the connecting bolts (21) and the driver flange (2).

4. The flywheel (10) according to claim 3, wherein insulating material layers are provided between at least one of the engagement surfaces and are disposed between one of the group consisting of: a support surface between the driver flange (2) and the flywheel flange (1), a centering collar surface (4) of the driver flange (2) and a support surface (5) of the flywheel flange at a centering shoulder (6), a surface of at least one of the driver flange (2) and the flywheel flange (1) in contact with the connecting bolts (21) and a surface of the passage through which the connecting bolts (21) extend.

5. The flywheel (10) according to claim 3, wherein insulating material layers are formed on the engagement surfaces between the driver flange (2) and the flywheel flange (1).

6. The flywheel (10) according to claim 5, wherein the insulating material layers consist of aluminum oxide deposited on the respective engagement surfaces.

7. The flywheel (10) according to claim 6, wherein an epoxy resin layer is deposited on the insulating aluminum oxide layer.

8. The flywheel (10) according to claim 1, wherein the separate insulating member (24) is a washer coated with an aluminum oxide layer.

9. The flywheel (10) according to claim 1, wherein the gaps (28) between the surface of the flywheel flange (1) and the connecting bolts (21) are sealed by sealing means (29).

\* \* \* \* \*